United States Patent
Strodtbeck et al.

(10) Patent No.: US 7,706,486 B2
(45) Date of Patent: *Apr. 27, 2010

(54) EFFICIENT DIVERSITY COMBINING FOR WIDEBAND DOWNLINK

(75) Inventors: Andrew L. Strodtbeck, Marina del Rey, CA (US); Jennifer Vollbrecht, Torrance, CA (US); Todd G. Ellenberger, Torrance, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/400,927

(22) Filed: Mar. 10, 2009

(65) Prior Publication Data

US 2009/0207947 A1 Aug. 20, 2009

Related U.S. Application Data

(63) Continuation of application No. 11/165,915, filed on Jun. 24, 2005, now Pat. No. 7,512,198.

(51) Int. Cl.
*H04B 1/10* (2006.01)
(52) U.S. Cl. .............. 375/349; 375/147; 375/265; 375/267; 375/341; 455/137; 455/303; 455/335; 370/465
(58) Field of Classification Search ........... 375/147, 375/260, 267, 262, 265, 340, 341, 348, 349; 455/132, 137, 303, 335; 370/464, 465
See application file for complete search history.

(56) References Cited

U.S. PATENT DOCUMENTS 6,192,038 B1 2/2001 Wallerius et al.
(Continued)

FOREIGN PATENT DOCUMENTS

WO 2005064975 A1 7/2005

OTHER PUBLICATIONS

Zhang et al., "Diversity Signal Reception Via Soft Decision Combining", IEEE International Conference on Acoustics, Speech and Signal Processing, vol. 1 of 6, May 7, 2001, pp. 2937-2940.

(Continued)

*Primary Examiner*—Dac V Ha
(74) *Attorney, Agent, or Firm*—Yee & Associates, P.C.; Baldwin D. Quan

(57) ABSTRACT

A communication system employing site diversity combing to increase link availability includes at least two receivers at receive sites within a single downlink beam separated by enough distance to provide decorrelation of weather phenomena—such as rain fade outages. A signal transmits digital symbols to all the receivers and may use bandwidth efficient modulation with forward error correction coding. Sampled symbol values for each codeword are produced at each receiver, which are connected by one or more ground links so that all data can be collected at one site. At least two different soft-decision computation modules translate the sampled symbol values from the different receivers into different sets of soft-decision values—which may be log-likelihood-ratio (LLR) values reflecting the probability value for each bit of the codeword—that are digitally synchronized and combined for use by a decoder. The technique thus avoids disadvantages of either coherent waveform combining or BER-based digital switching.

15 Claims, 5 Drawing Sheets

U.S. PATENT DOCUMENTS

| | | | |
|---|---|---|---|
| 6,574,293 | B1 | 6/2003 | Khayrallah et al. |
| 6,654,340 | B1 | 11/2003 | Jones et al. |
| 6,944,245 | B2 | 9/2005 | Stewart et al. |
| 7,106,802 | B1 * | 9/2006 | Heiskala et al. ............. 375/265 |
| 7,120,212 | B1 | 10/2006 | Launay et al. |
| 7,512,198 | B2 * | 3/2009 | Strodtbeck et al. .......... 375/349 |
| 2007/0071150 | A1 | 3/2007 | Yang et al. |
| 2007/0098122 | A1 | 5/2007 | Tseng et al. |

OTHER PUBLICATIONS

Sakai et al., "Soft Decision Viterbi Decoding with Diversity Combining for Multi-Beam Mobile Satellite Communication Systems", IEEE Journal on Selected Areas in Communications, vol. 13, No. 2, Feb. 1, 1995, pp. 285-290.

PCT Search Report for PCT/2006/019700, Sep. 22, 2006, The Boeing Company.

PCT Written Opinion for PCT/2006/019700, Sep. 22, 2006, The Boeing Company.

* cited by examiner

EFFICIENT DIVERSITY COMBINING FOR WIDEBAND DOWNLINK

This application is a continuation of application Ser. No. 11/165,915, filed Jun. 24, 2005, status allowed.

BACKGROUND OF THE INVENTION

The present invention generally relates to radio frequency communication systems and, more particularly, to a site diversity technique for providing high link availability on a satellite or other radio frequency (RF) link that is challenged by thin power margins and high probability of deep rain fade.

Site diversity refers generally to a set of techniques used to provide high link availability on a satellite or other RF link that is challenged by thin power margins and high probability of deep rain fades, such as a wideband bandwidth efficient modulation (BEM) link. It is not always possible to locate a BEM receive station in a low precipitation area of the world. In some cases, it may not be possible to build a link with ample power margin to overcome all high or moderate probability rain fades. Rather than over-sizing the link to carry large rain-fade power margins, which could be cost-prohibitive, site diversity may be desirable to lower the required power margin and increase link availability. Using site diversity, the communication system receives the transmitted signal into two or more geographically separated receive locations, generally within the same downlink beam. These receive locations are separated far enough in distance to provide decorrelation of atmospheric phenomena so that; for example, if it is raining hard on one receiver (producing a deep rain fade), it is probably not raining as hard (thus lower rain fade) over another receiver. Thus, by suitably combining information from both or all received signals it is generally possible to reconstruct the original information from the transmitted signal with a greater degree of accuracy than would be possible using only one signal. Thus, link availability, e.g., the percentage of time that a link can provide a signal of acceptable quality for accurate reconstruction of the original information, can be increased in comparison to a link that uses only one receiver. But previous methods of combining multiple received signals are usually impractical or very costly for a very high data rate BEM link.

For example, prior art techniques for site diversity include one that involves coherently combining the received RF or intermediate frequency (IF) waveforms (referred to as "coherent waveform combining") and another that involves demodulating the received data streams and making "either-or" decisions down stream about which packets to accept from which stream (referred to as "digital switching").

To perform the first technique, coherent waveform combining—assuming for the sake of example, two receive stations—some component of the communication system must perfectly align and then combine both RF signals at one common location with negligible distortion. Such perfect alignment is not feasible for ultra-wideband communications, especially with BEM formats that are highly distortion-sensitive.

The other technique, digital "either-or" switching, requires very fast decision-making capabilities, which can be either not feasible or cost prohibitive for the high frequencies and data rates involved. Moreover, the process of decoding the signals involves at one stage making a "soft decision" about the data symbol received and then refining the soft decision into a "hard decision" at a later stage of the decoding process. Digital "either-or" switching requires very fast decision-making capabilities, and does not provide optimal performance, since decoding must be performed on the individual data streams, leaving only the information from the "best" stream to be kept, and any additional possible performance benefit of the other stream is wasted.

As can be seen, there is a need for optimally combining two or more received signals to obtain a single received data stream without the difficulties of RF coherent combining and without the performance loss of digital switching methods. There is also a need for an efficient, low cost, low complexity, and high performance method of combining two BEM downlinks separated by significant distance that achieves optimal rain-fade resistance. Moreover, there is a need for BEM signal combining in which not only is the unit cost low, but the total system requirements, and therefore the total system cost, is also very low.

SUMMARY OF THE INVENTION

In one embodiment of the present invention, a communication system includes at least two receivers that receive a transmitted signal. One of the receivers produces a first stream of sampled symbol values, and a second receiver produces a second stream of sampled symbol values. A first computation module translates the first stream of sampled symbol values into a stream of first soft decision values (using, for example, log likelihood ratio (LLR)) and a second computation module translates the second stream of sampled symbol values into a stream of second soft-decision values. A combining module combines the first soft-decision values and the second soft-decision values.

In another embodiment of the present invention, a receive site for a site diversity-combining communication system includes: a first computation module that translates sampled symbols from the transmitted signal into a stream of first soft-decision values from the transmitted signal. A connection to at least one other site provides data for a stream of second soft-decision values from the transmitted signal. A combining module combines the first soft-decision values and the second soft-decision values into combined soft-decision values for each symbol of the transmitted signal.

In still another embodiment of the present invention, a site diversity-combining communication system includes: first and second receive sites connected to a ground link. A first receiver located at the first receive site receives a modulated carrier signal transmitting a coded stream of symbols. A second receiver located at the second receive site also receives the modulated carrier signal transmitting the same coded symbols. A first demodulator produces a first steam of sampled symbol values from the coded symbol stream. A second demodulator produces a second stream of sampled symbol values from the same stream of coded symbols. A first soft-decision computation module translates the first sampled symbol values into a first set of soft-decision values (which may be, for example, LLR values) for the stream of coded symbols. A second soft-decision computation module translates the second sampled symbol values into a second set of soft-decision values for the stream of coded symbols. A combining module combines the first set of soft-decision values and the second set of soft-decision values to produce a set of combined soft-decision values for the stream of coded symbols. Data is sent from the first and second receive sites to the combining module via the ground link so that the first and second sets of soft-decision values are provided to the combining module.

In yet another embodiment of the present invention, a communication system using site diversity combining for high link availability includes: first and second receive sites connected to a transmitter via a combined link that transmits a stream of coded symbols using a modulated carrier signal. The first and second receive sites are separated by a sufficient distance to provide decorrelation of weather phenomena. The first receive site includes a first receiver that receives the modulated carrier signal and a first demodulator that demodulates the carrier and produces a first sampled symbol value from the coded symbol. The second receive site includes a second receiver that receives the modulated carrier signal and a second demodulator that demodulates the carrier and produces a second sampled symbol value from the same coded symbol. The first and second receive sites are connected via a ground link so that a joint soft-decision computation module receives the first sampled symbol value and the second sampled symbol value. The joint soft decision computation module then computes the joint soft-decision output value for the stream of coded symbols. A decoder connected to the combining module produces a set of decoded bit values for the coded symbol.

In a further embodiment of the present invention, a satellite communication system includes a transmitter that is located on the satellite and that transmits coded symbols via a modulated carrier signal, using a bit mapping of coded symbols to a modulation scheme, over a combined link comprising at least two links, i.e., a first and second link. The first link connects a first receive site to the transmitter, the first receive site including a first receiver that receives the modulated carrier signal and a first demodulator that demodulates the carrier and (referring now to one coded symbol in particular) produces a first sampled symbol value I,Q pair from the coded symbol. The second link connects a second receive site to the transmitter, the second receive site including a second receiver that receives the modulated carrier signal and a second demodulator that demodulates the carrier and produces a second sampled symbol value I,Q pair from the same coded symbol. The first receive site and the second receive site are separated from each other by a sufficient distance to provide decorrelation of weather phenomena. The first receive site and the second receive site are connected via a ground link to provide the first and second sampled symbol value I,Q pair as two coded input symbol streams to a joint soft-decision computation module. The joint soft-decision computation module then computes the joint soft-decision output value for the two coded input symbol streams. A decoder connected to the combining module produces a set of decoded bit values for the coded symbol.

In a still further embodiment of the present invention, a method for site diversity combining, includes the steps of: receiving a signal at at least two receive sites; translating the signal from each of the receive sites into soft-decision values; and combining the soft-decision values at one of the receive sites, the combined soft-decision values to be used by a decoder.

These and other features, aspects and advantages of the present invention will become better understood with reference to the following drawings, description and claims.

DETAILED DESCRIPTION OF THE INVENTION

Figure 1:
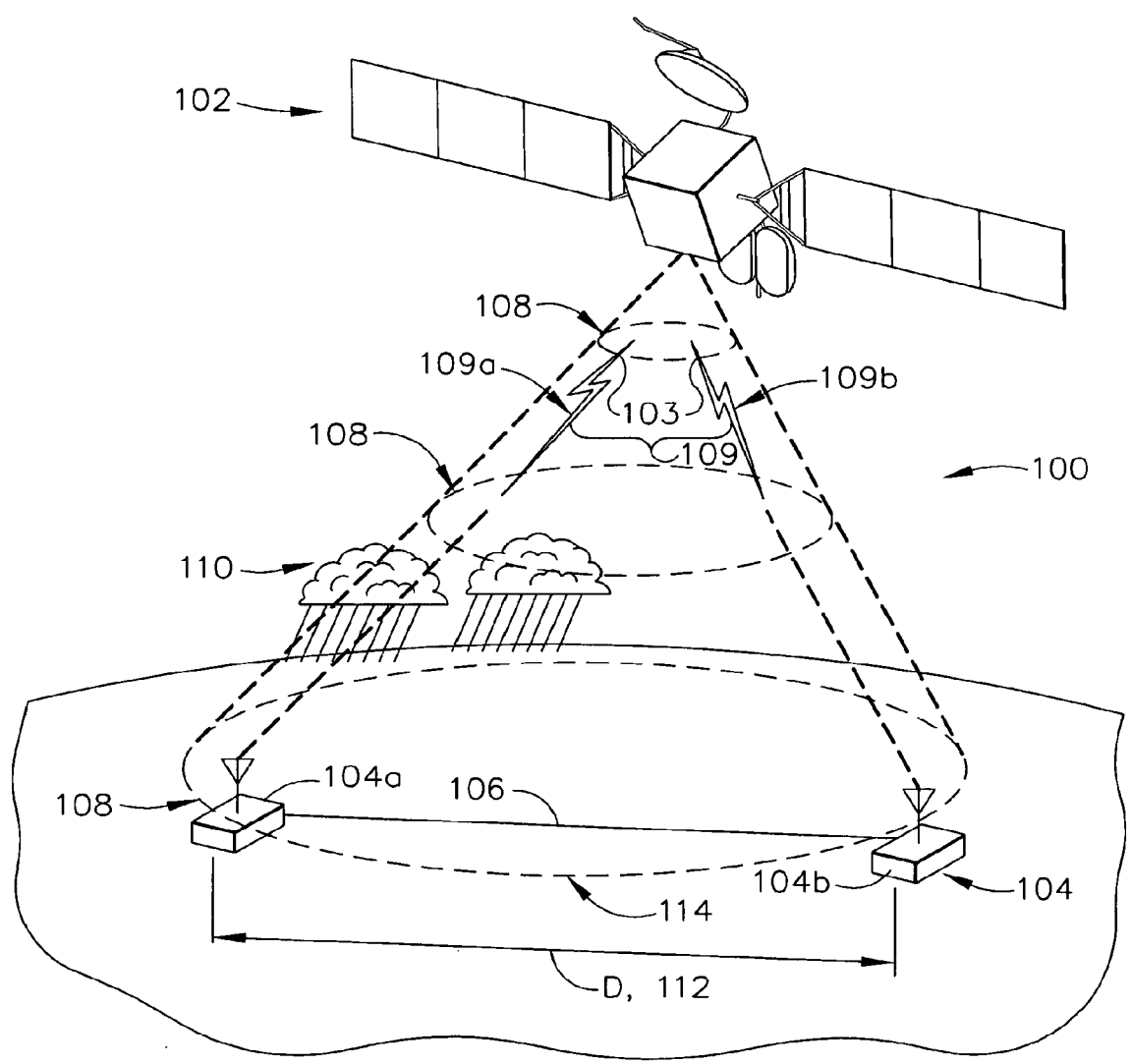
FIG. 1 is a diagram of a satellite communication system in accordance with one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides site diversity combining to overcome atmosphere induced link outages and increase communication system link availability, in particular, for ultra-wideband bandwidth efficient modulation (BEM) links that may otherwise not be able to operate according to required link availabilities. One embodiment enables a very simple and low cost solution to the site diversity combining problem, enabling use of wideband BEM downlinks into regions with high rain fade characteristics. For example, one embodiment can utilize components already present in a wideband BEM link and BEM receiver chain, with some simple modifications and a high-speed digital connection between receive sites. One embodiment can perform optimal soft-decision combining on two or more BEM waveforms originated from a single transmitter and received into sites geographically separated by an arbitrary distance but within the same receive beam. The distance may be nominally 10.0 kilometers (km), e.g., between 3 km and 100 km—the geographic separation being required to provide decorrelation of atmospheric phenomena—such as rain cells—and provide increased link availability.

A novel feature of one embodiment of the present invention is the use of combining at soft-decision outputs (for example, log-likelihood-ratio (LLR) table outputs) to provide optimal performance combining with low complexity. One embodiment of the present invention, by using sampled symbol values from different receivers, achieves a performance benefit similar to that of prior art optimal coherent combining techniques over digital "either-or" switching based schemes that don't perform very well, but without requiring the difficult-to-achieve alignment and distortionless re-transmission of wideband BEM radio frequency (RF) signals that would be required by those prior art techniques. One embodiment provides less complicated and better performing site diversity combining than digital "either-or" switching based schemes. A significant feature of one embodiment is its novel solution to synchronization problems encountered in trying to synchronize two wideband RF signals. Rather than trying to synchronize two wideband RF signals, the novel approach uses existing framing information utilized for the block coding/decoding function, to achieve digital synchronization that may be characterized as simple, easy, and cheap by comparison to prior art techniques of RF synchronization that are typically analog in nature, rather than digital, and so are difficult to maintain at the precision needed. Key points are: (1) combining forward error correction coding (FEC) with the coherent combining function significantly reduces the challenges and complexity of diversity combining; (2) embodiments address the processing challenges of high speed implementation, for example, simple synchronization and minimal precision analog to digital converters (A/D); (3) for satellite links, the performance for one embodiment is very close to the optimal achieved by joint equalization/combining.

One embodiment improves practicality by reducing the dynamic range of the signal sent from the receive site to the decoder. Rather than represent the entire dynamic range, automatic gain control is applied prior to transmission to the decoder. Computation of the correct soft-decision metric (e.g., log-likelihood-ratio) is accomplished by also transmitting the constituent downlink signal-to-noise ratio to the log-likelihood computation. Since the signal-to-noise ratio varies slowly compared to the signal, the bandwidth required is much less than needed to represent the non-gain controlled signal to a similar level of fidelity. This can significantly enhance the applicability of embodiments of the present invention since the high sample rate analog-to-digital converters are only available with limited precision. Implementation of this improvement can be further simplified by utilizing the automatic gain control setting as a surrogate for the signal-to-noise ratio. Once the system noise level is calibrated the automatic gain control setting provides a high fidelity estimate of the signal-to-noise ratio.

FIG. 1 illustrates communication system 100, employing site diversity combining in accordance with one embodiment of the present invention. Communication system 100 may include a satellite 102 having RF communications equipment—such as transmitters and receivers—for communication with ground stations 104—which may include receive site 104a and receive site 104b. Communications may be provided over a combined link 109 by a single downlink beam 108, which may include multiple links—such as link 109a between satellite 102 and receive site 104a and link 109b between satellite 102 and receive site 104b. For example, links 109a, 109b may be BEM links that transmit a BEM modulated RF carrier signal 103. Although communication system 100 is illustrated with two ground stations and two links, any practical number of ground stations 104 and corresponding links 109 could be used in accordance with alternative embodiments of the present invention. Links 109 may be subject to rain fade phenomena caused by atmospheric disturbances such as rain 110 and other factors affecting link availability, which may be described as the percentage of time that a rain loss power allocation is not exceeded. Ground stations 104, in particular, receive sites 104a and 104b may communicate over a ground link 106. Ground link 106 may be, for example, a high-speed digital connection or any suitable connection for achieving synchronization of data between the sites 104 or site 105 (FIG. 2C). The ground link 106 may be implemented, for example, using a fiber optic network, microwave link, wire, or any other suitable communication medium. Receive sites 104a and 104b, for example, may be separated by a distance 112, labeled "D" in FIG. 1. Distance 112, for example, may nominally be about 10 km to provide decorrelation of atmospheric phenomena for site diversity, however, the two (or more) receive sites must be within the same downlink beam 108. For example, link 109a may be subject to rain fade from rain 110 while weather is clear for link 109b, so that link 109b is not subject to rain fade at the same times—i.e., at times highly correlated—as link 109a. Thus, by combining data from receive sites 104a and 104b over ground link 106, overall link availability for links 109 can be improved over the link availability for any one single link—such as link 109a.

Figure 2A:
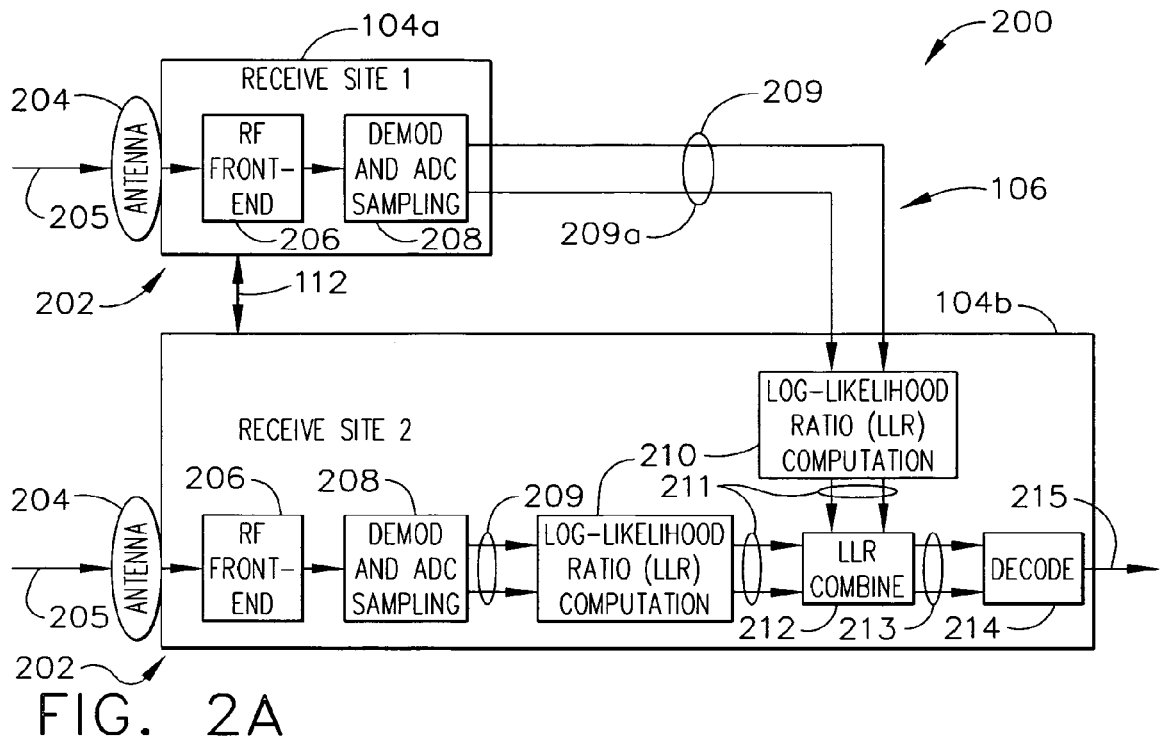
FIGS. 2A, 2B, and 2C are system block diagrams showing alternative exemplary embodiments of a downlink, receiving subsystem, in accordance with possible embodiments of the present invention, for a communication system such as that shown in FIG. 1.
Figure 2B:
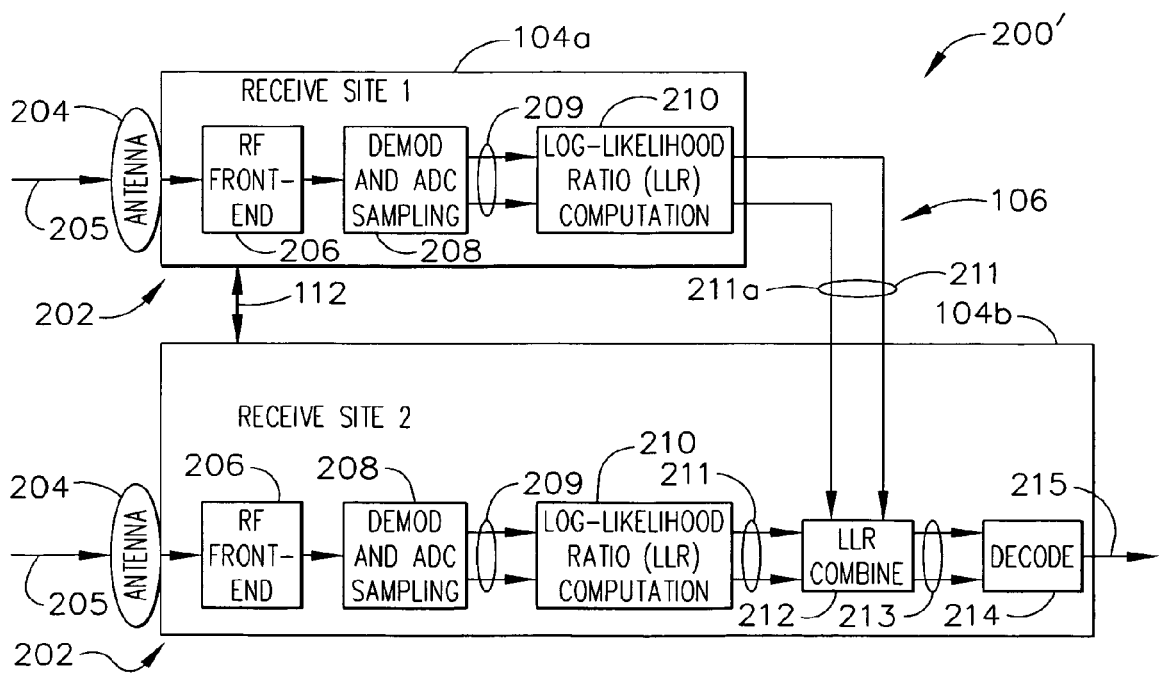
Figure 2C:
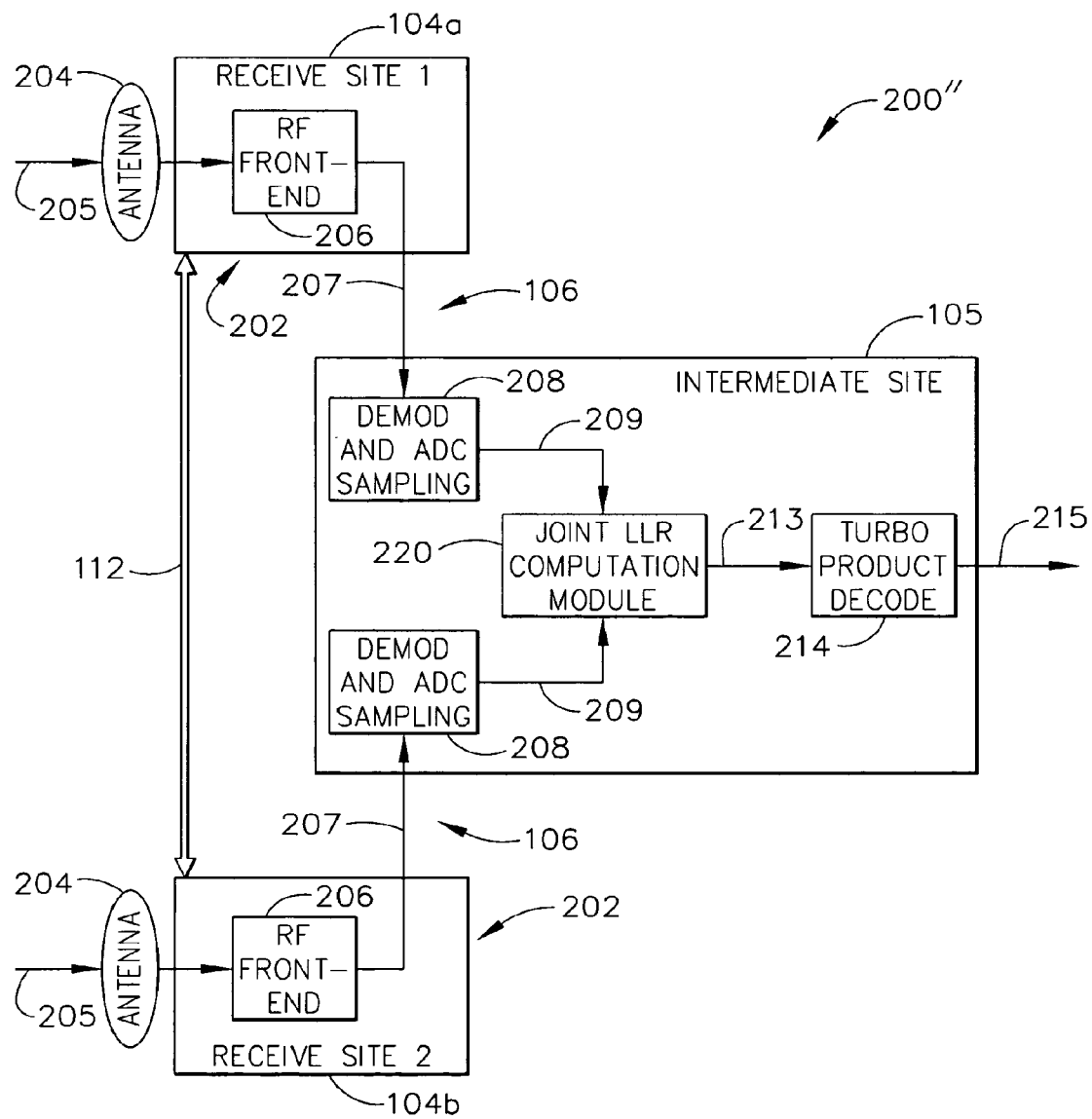

FIG. 2A illustrates a receive system 200 using site diversity combining according to one embodiment. FIGS. 2B and 2C illustrate receive systems 200' and 200" for site diversity combining according to alternative exemplary embodiments. Receive systems 200, (i.e., 200, 200', 200") may include a first receive site 104a and second receive site 104b. Receive site 104a and receive site 104b may be separated by a distance 112 within the same downlink beam 108 and connected by a ground link 106, as shown in FIG. 1.

Each receive site 104a, 104b may include a receiver 202, which may include an antenna 204 for receiving an RF signal 205 in the form of a modulated carrier on a link 109, from a transmitter, which may be located, for example, on satellite 102. Signal 205 may be BEM modulated, for example, using quadrature amplitude modulation (QAM), e.g., 256-QAM or 64 QAM, or any other suitable modulation format for transmitting data as digital codeword symbols—such as quadrature phase shift keying (QPSK), binary phase shift keying (BPSK), and amplitude phase keying (APK). Data in signal 205 may be encoded using an iterative block code—such as a turbo product code or low density parity check code. Each receiver 202 may include an RF front end 206 that receives the modulated carrier signal 205 and prepares it for demodulator 208. Demodulator 208 may demodulate the signal 205 and perform analog-to-digital conversion (ADC or A/D) sampling to provide a data stream of sampled symbol values 209 of coded symbols.

As shown in FIG. 2A, one of the streams of sampled symbol values, e.g., symbol values 209a, then may be transmitted via fiber optic or other digital means over ground link 106, and both (or all) streams collected at one receive site, e.g. receive site 104b. The decoding process then may be begun on each data stream, i.e., coded symbol values 209, by soft-decision computation modules 210, which may be implemented, for example, as a turbo-decoder log-likelihood-ratio table-lookup function, and produce soft-decision output values 211, which may be, for example, LLR values. While LLR is one implementation used as an example to illustrate one embodiment of the present invention, another approach that may be used is to do normal weighted coherent combining prior to the LLR or soft decision metric computation. The synchronization approach illustrated by use of ground link 106 leverages the existing forward error correction (FEC) synchronization to reduce the problem of diversity combining to ambiguity resolution. In other words, combining FEC coding with the coherent combining function significantly reduces the challenges and complexity of diversity combining. Also, a soft-decision computation module 210 and a soft-decision combining module 212, as shown in FIG. 2A, may be combined into a single joint soft-decision computation module 220 as seen in FIG. 2C.

Alternatively, as shown in FIG. 2B, the soft-decision output values 211 may be computed at each receive site—e.g., receive sites 104a and 104b in the two-receive site example being used for illustration—and one of the streams of soft-decision output values 211, e.g., soft-decision outputs 211a, then may be transmitted via fiber optic or other digital means over ground link 106, and both (or all) streams of soft-decision output values 211 collected at one receive site, e.g. receive site 104b. In either case, whether the data is in the form, for example, of sampled symbol values of coded symbols or soft-decision output values (e.g., LLR values), sufficient data may be provided via ground link 106 (or multiple links for more than two sites) so that soft-decision output values 211 from all receive sites are provided to soft-decision combining module 212.

In another alternative, as shown in FIG. 2C, all demodulators 208 may be located at an intermediate site 105, with intermediate frequency (IF) band data 207 passed over ground links 106 to be collected at site 105. All of the different data streams, e.g., sampled values 209 of coded symbols, may be processed by a joint soft-decision computation module 220 that performs the functions of soft-decision computation modules 210 and soft-decision combining module 212. As shown in the figures, the joint soft-decision computation module 220 may be located at any of the receive sites—such as sites 104a, 104b—or an intermediate site or central site—such as site 105—so long as a data ground link 106 connects the site (whether a receive site or other site) at which joint soft-decision computation module 220 resides so that data from at least two receive sites is provided to joint soft-decision computation module 220.

Among the alternatives illustrated in FIGS. 2A-2C, as well as others that may exist, an optimal option may be chosen as one that involves the lowest data throughput, lowest cost digital link (or links)—such as link 106—between receive sites—such as receive sites 104a, 104b. Regardless of the alternative chosen, existing framing information in the data streams passed within and between sites may be used to implement digital synchronization of the data streams. The synchronized data streams may be, for example, a first stream of sampled symbol values 209 and a second stream of sampled symbol values 209a as shown in FIG. 2A. The synchronized streams may also be, for example, a first stream of soft decision values 211 and a second stream of soft decision values 211a as shown in FIG. 2B. As shown in FIG. 2C, the synchronized streams may be, for example, the first and second streams of sampled symbol values 209 at intermediate site 105. The framing information used, for example, may be existing framing information utilized for the block coding/decoding function performed at demodulator and ADC sampling modules 208 and which may be made available in the different data streams. With reference to FIGS. 2A-2C, for example, digital synchronization may be performed where the data streams come together, for example, at soft decision combining module 212 or joint soft decision computation module 220.

As shown in any of FIGS. 2A-2C, soft-decision combining module 212, or joint computation module 220, may produce combined soft-decision values 213, which may be, for example, combined LLR values such as by adding or averaging. The combined soft-decision values 213 may be considered as containing the best available information about the data (coded symbols) from modulated carrier signal 205, and may pass the combined soft-decision values 213 to decoder 214, which may be implemented, for example, as an iterative block decoder such as a turbo product code decoder or low density parity check code decoder. Decoder 214 may produce a set of decoded bit values 215 that reconstruct the coded symbol data originally transmitted by satellite 102 with a higher link availability than for any single receive site.

Figure 3:
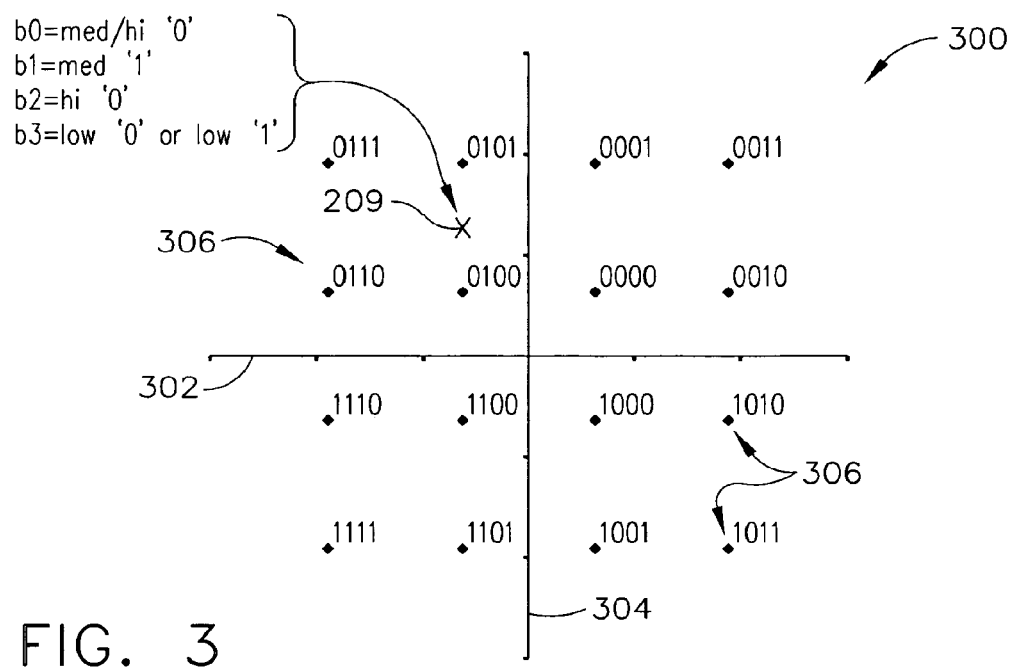
FIG. 3 is phase plane diagram for a 16-QAM modulation scheme used as an example to illustrate one embodiment of the present invention.

A simplified illustration of the functions of soft-decision computation module 210 and soft-decision combining module 212 is given with reference to FIG. 3. The example illustrated by FIG. 3 assumes that 16-QAM is transmitted so that any 16-QAM codeword symbol 306 may have 2 bits (4 possible distinct values) on the in-phase (I) axis 302 and 2 bits (4 distinct values) on the quadrature (Q) axis 304 of phase plane 300. Thus, there are 16 possible distinct values for the 16-QAM symbols 306, each represented by a dot in FIG. 3, and each of which can convey 4-bits of information for each symbol 306 transmitted. FIG. 3 shows one possible mapping of the 4 bits to the 16-QAM symbols 306, where a string of 4 bits, represented as "0" or "1" appears next to the dot representing each symbol 306. Each string of bits may be referred to as (b0,b1,b2,b3).

A possible received sampled symbol value 209, which may be received by one of receivers 202, is represented by an 'x' in FIG. 3. The A/D conversion of demodulators 208 may produce a sampled symbol value 209 that has 8 bits (256 possible values) on the I-axis 302 and 8 bits (256 values) on the Q-axis 304. Thus, sampled received symbol value 209 may be located at a point on phase plane 300 not coincident with one of the 16-QAM symbols 306, and located by a value I measured along I-axis 302 and a value Q measured along Q-axis 304. The values I and Q (sampled symbol values) determining the location of received symbol value 209 may be fed into the soft-decision computation module 210, which may be implemented, for example, as an LLR lookup table. Soft-decision computation module 210, e.g., the LLR table, may translate the received sampled symbol value 209 (16-bits in the example, 8 sample bits for I and 8 sample bits for Q) into an n-bit representation ranging in value from 0 to $2^n-1$. The value of n-bit representation may be a representation of the confidence with which each of the 4 bits (b0,b1,b2,b3) of the 16-QAM bit mapping may be assigned to a logic '1' or '0', in which the log-likelihood ratio is used as a measure of the confidence in assigning an individual mapping bit to be a logical 'one' or 'zero' given a received symbol value 209. The soft-decision—in this example, LLR—output values 211 may be comprised of such n-bit representations, referred to as "LLR values". For example, for the received symbol value 209 represented by x in FIG. 3, having bits (b0,b1,b2,b3), each bit may receive an n-bit representation having a value from 0 to $(2^n-1)$ so that the soft-decision LLR output value 211 for symbol 209 may be a set of four LLR values (v0,v1,v2,v3).

The LLR soft-decision output values 211 may be combined by soft-decision combining module 212 for each symbol transmitted and received at two or more receive sites. For example, the LLR soft-decision output values 211 may be combined by adding to give a combined soft-decision LLR value (v0,v1,v2,v3) 213 for the particular symbol, and the value (v0,v1,v2,v3) 213 may be passed to decoder 214 which may be designed to work with values over an appropriate range of values, as understood by those of ordinary skill in the art. Alternatively, LLR soft-decision output values 211 may be combined by averaging to give a combined LLR value 213 and the value may be passed to decoder 214, which may be designed to work with a correspondingly appropriate range of values.

EXAMPLE

Figure 4:
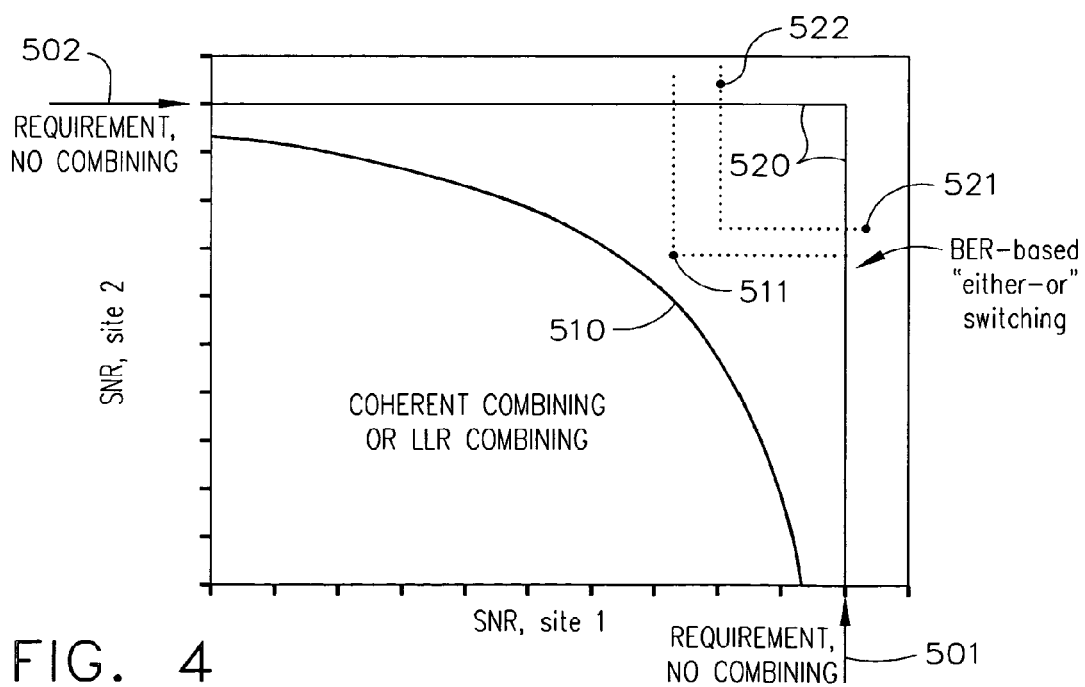
FIG. 4 is a graph illustrating performance comparison between diversity combining in accordance with an embodiment of the present invention and bit error rate based diversity combining.

FIG. 4 represents the performance advantages of joint-LLR diversity combining according to one embodiment for an example with two receive sites. It is assumed that the sites are separated by a large enough distance to ensure decorrelation of atmospheric phenomena. Aside from quantization errors in the soft-decision computation output (which can be made negligible by proper choice of number of quantization levels), joint-soft-decision combining according to one embodiment may have identical performance to the coherent combining method of diversity combining (but without the disadvantages of that method, as described above). In this plot, the overall link, e.g., combined link 109 provided by downlink beam 108, can be closed whenever the combined SNR operating points of site1 (abscissa) and site2 (ordinate) lie to the right and above the curves shown (curve 510 for joint-LLR or coherent combining; curve 520 for BER based switching combining). Thus, the simpler BER based switching approach (curve 520) closes the link whenever one or the other site experiences SNR above the un-combined link SNR requirement, i.e., point 501 for site 1, point 502 for site 2. For example, any combined operating point either to the right of, e.g. point 521, or above, e.g., point 522, curve 520 experiences SNR above the un-combined link SNR requirement and closes the link using BER based switching combining. Coherent combining or joint-LLR combining according to one embodiment (curve 510) permits even better performance: for example, in the case of equal SNR into both sites, the coherent/LLR combining closes the link for 3 dB lower SNR. Point 511, for example, experiences lower SNR for both sites 1 and 2 than either of point 521 or point 522 yet closes the link. In general, any operating point between curves 510 and 520 closes the link using joint-LLR combining but not using BER based switching combining.

Figure 5:
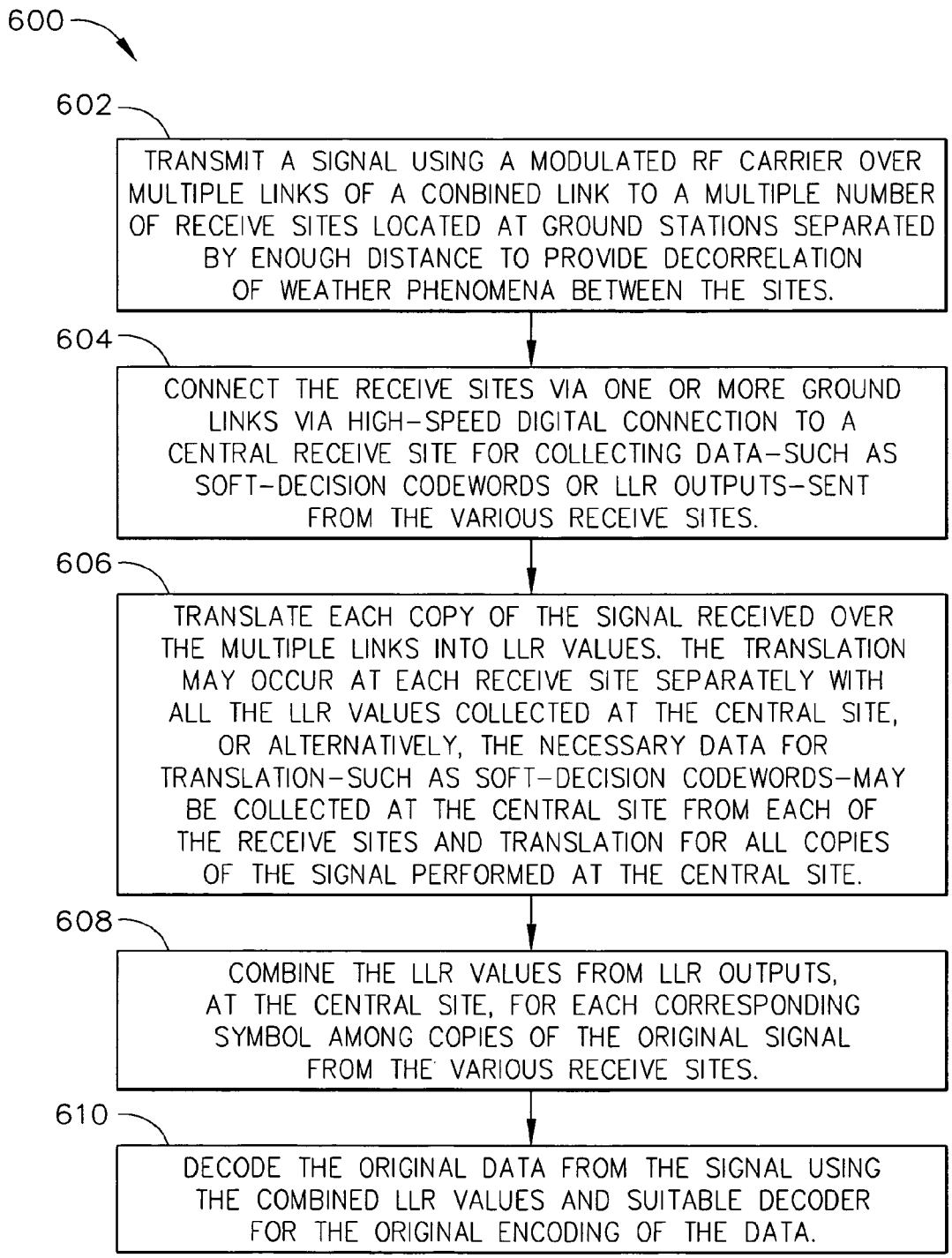
FIG. 5 is a flowchart of a method for diversity combining in accordance with one embodiment of the present invention.

FIG. 5 illustrates method 600, in accordance with one embodiment of the present invention, for site diversity combining for achieving high link availability on a satellite or other radio frequency link that is challenged by thin power margins and high probability of deep rain fade. At step 602 a signal—such as signal 103 or signal 205—may be transmitted, for example, from a satellite 102 using a modulated RF carrier over a single downlink beam 108 which contains multiple receive sites—such as receive sites 104a, 104b—within its footprint 114.—For example, links 109a, 109b may provide a combined link 109 within the footprint 114 of downlink beam 108—to a multiple number of receive sites—such as receive sites 104a, 104b—located at ground stations 104 that may be separated by enough distance, nominally about 10 km, to decorrelate weather phenomena between the receive sites.

At step 604, the receive sites may be connected via a ground link—such as a ground link 106 between receive sites 104a, 104b—to a central receive site, e.g., receive site 104b in the exemplary embodiment illustrated in FIGS. 2A and 2B or intermediate site 105 in the exemplary embodiment illustrated in FIG. 2C, for collecting data sent from the various receive sites. The connection over ground link 106 may be a high speed digital connection, for example, or any link capable of providing the synchronization needed for coherent or joint LLR combining. The data may be in the form of, for example, IF band data 207, sampled values 209 of a coded stream of symbols, or soft-decision (e.g., LLR) values of soft-decision output values 211.

At step 606, each copy of the signal received over the multiple links may be translated into soft-decision values (e.g., LLR values). The translation may occur at each receive site separately with all the soft-decision values collected at the central site, or alternatively, the necessary data for translation—such as soft-decision information from each symbol (e.g. sampled values 209)—may be collected at the central site from each of the receive sites and translation for all copies of the signal may be performed at the central site. At step 608, the soft-decision values—such as LLR soft-decision output values 211—may be combined at one of the receive sites, e.g., the central site 104b or intermediate site 105, for each corresponding symbol, i.e., copy, of the original signal, e.g. signal 103 or signal 205. At step 610, the original data of the signal may be decoded from the signal using the combined soft-decision values—such as combined soft-decision values 213—and turbo product decoder or suitable decoder for the original encoding of the data, e.g., decoder 214.

It should be understood, of course, that the foregoing relates to exemplary embodiments of the invention and that modifications may be made without departing from the spirit and scope of the invention as set forth in the following claims.

We claim:

1. A method for site diversity combining, comprising the steps of:
   receiving a transmitted signal at at least two receive sites, the transmitted signal includes coded symbols;
   translating, at a first receive site of the at least two receive sites, sampled symbol values from the coded symbols of the transmitted signal into a stream of first soft-decision values from the transmitted signal, the first soft-decision values being first log likelihood ratio values;
   translating, at at least one other receive site of the at least two receive sites, sampled symbol values from the coded symbols of the transmitted signal into a stream of second soft-decision values from the transmitted signal, wherein the second soft-decision values are second log likelihood ratio values;
   connecting to the at least one other receive site of the at least two receive sites that provides data for the stream of second soft-decision values from the transmitted signal;
   digitally synchronizing the stream of first soft-decision values and the stream of second soft-decision values; and
   combining the first soft-decision values and the second soft-decision values into combined soft-decision values for each coded symbol of the transmitted signal.

2. The method of claim 1, further comprising the step of:
   separating the receive sites far enough to decorrelate weather phenomena between the receive sites.

3. The method of claim 1, further comprising the step of:
   connecting the receive sites via a ground link.

4. The method of claim 1, further comprising the step of:
   sending the sampled symbol values of coded symbols via a ground link between the receive sites.

5. The method of claim 1, further comprising the step of:
   sending the soft-decision values via a ground link between the receive sites.

6. The method of claim 1, further comprising the step of:
   transmitting the signal using bandwidth efficient modulation.

7. The method of claim 1, wherein the combining step averages the first log likelihood ratio values for a coded symbol of the transmitted signal with the second log likelihood ratio values for the coded symbol of the transmitted signal to provide the combined soft-decision values for the each coded symbol of the transmitted signal.

8. The method of claim 7, further comprising the step of:
   decoding data from the transmitted signal using the combined soft-decision values for the each coded symbol of the transmitted to signal to produce a set of decoded bit values from the coded symbol of the transmitted signal, the combined soft-decision values being averaged combined log likelihood ratio values.

9. The method of claim 1, wherein the data for the stream of second soft-decision values include the second soft-decision values.

10. A method for site diversity combining, comprising the steps of:
    receiving, at a first receiver located at a first receive site, a modulated carrier signal transmitting a coded symbol;
    receiving, at a second receiver located at a second receive site, the modulated carrier signal transmitting the coded symbol, wherein at least one of the first and second receive sites is connected via at least one ground link;
    producing, using a first demodulator, a first sampled symbol value from the coded symbol;

producing, using a second demodulator, a second sampled symbol value from the coded symbol;

translating, using a first soft-decision computation module, the first sampled symbol value into a first set of soft-decision values for the coded symbol;

translating, using a second soft-decision computation module, the second sampled symbol value into a second set of soft-decision values for the coded symbol that are digitally synchronized with the first set of soft-decision values, wherein the first soft-decision computation module and the second soft-decision computation module are at a same receive site and sampled symbol values are sent between the first and second receive sites via the at least one ground link; and combining, using a soft-decision combining module, the first set of soft-decision values and the second set of soft-decision values to produce a set of combined soft-decision values for the coded symbol, wherein data is sent from at least one of the first and second receive sites to the soft-decision combining module via the ground link so that the first set of soft-decision values and the second set of soft-decision values are provided to the soft-decision combining module.

11. A method of claim 10, further comprising:

producing a set of decoded bit values for the coded symbol using a decoder connected to the soft-decision combining module.

12. A method of claim 10, wherein the first sampled symbol value is a pair I,Q of values, wherein I is an in-phase value and Q is a quadrature value determining the location of the coded symbol in a phase plane.

13. A method of claim 10, wherein the first soft-decision computation module translates an I,Q pair of the first sampled symbol value from the coded symbol into the first set of soft-decision values that are n-bit representations of the likelihood of each bit of a bit mapping for a modulation scheme of the modulated carrier signal transmitting the coded symbol.

14. A method for site diversity combining, comprising:

transmitting, using a transmitter that is located on a satellite, a coded symbol via a modulated carrier signal, using a bit mapping of coded symbols to a modulation scheme, over a combined link comprising at least two links, including a first link and a second link;

connecting, via the first link, a first receive site to the transmitter, the first receive site including a first receiver that receives the modulated carrier signal and a first demodulator that demodulates the modulated carrier signal and produces a first sampled symbol value I,Q pair from the coded symbol;

connecting, via the second link, a second receive site to the transmitter, the second receive site including a second receiver that receives the modulated carrier signal and a second demodulator that demodulates the modulated carrier signal and produces a second sampled symbol value I,Q pair from the coded symbol, wherein the first receive site and the second receive site are separated from each other by a distance that allows decorrelation of weather phenomena;

the first receive site and the second receive site being connected via a ground link to provide the first sampled symbol value I,Q pair and the second sampled symbol value I,Q pair to a joint soft-decision computation module to compute a combined soft-decision output value for the coded symbol; and receiving, by a decoder that is connected to the joint soft-decision computation module, the combined soft-decision output value and producing a set of decoded bit values for the coded symbol.

15. The method of claim 14, wherein the transmitter uses bandwidth efficient modulation; and the modulation scheme is chosen from quadrature amplitude modulation, quadrature phase shift keying, binary phase shift keying, and amplitude phase keying.

* * * * *